(12) United States Patent
Xu et al.

(10) Patent No.: US 7,317,934 B2
(45) Date of Patent: Jan. 8, 2008

(54) CONFIGURABLE COMMUNICATIONS MODULES AND METHODS OF MAKING THE SAME

(75) Inventors: Hui Xu, San Jose, CA (US); Janet L. Yun, Santa Clara, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 618 days.

(21) Appl. No.: 10/632,745

(22) Filed: Aug. 1, 2003

(65) Prior Publication Data

US 2005/0025307 A1 Feb. 3, 2005

(51) Int. Cl.
*H04B 1/38* (2006.01)
*H03K 17/16* (2006.01)

(52) U.S. Cl. .................. 455/561; 455/428; 326/30; 326/26; 326/83

(58) Field of Classification Search .......... 326/30, 326/26–27, 83, 86; 370/242; 455/561, 428, 455/349; 385/134, 53; 439/133, 157
See application file for complete search history.

(56) References Cited

U.S. PATENT DOCUMENTS

| | | | |
|---|---|---|---|
| 5,553,250 A * | 9/1996 | Miyagawa et al. ........... 326/86 |
| 6,203,333 B1 | 3/2001 | Medina et al. | |
| 6,220,873 B1 | 4/2001 | Samela et al. | |
| 6,385,547 B1 * | 5/2002 | Bogli ........................ 361/91.1 |
| 6,407,639 B1 * | 6/2002 | Jean et al. .................. 330/298 |
| 6,418,121 B1 | 7/2002 | Flickinger et al. | |
| 6,469,906 B1 | 10/2002 | Baltz et al. | |
| 6,498,890 B1 * | 12/2002 | Kimminau .................. 385/134 |
| 6,515,501 B2 * | 2/2003 | Bosnyak et al. ............... 326/30 |
| 6,738,415 B2 * | 5/2004 | Drost et al. ................ 375/219 |
| 7,066,746 B1 * | 6/2006 | Togami et al. ............. 439/157 |
| 2006/0159399 A1 * | 7/2006 | Erdman et al. ................ 385/53 |
| 2007/0020976 A1 * | 1/2007 | Tirtosupono ................ 439/133 |
| 2007/0059953 A1 * | 3/2007 | Togami et al. ............. 439/76.1 |

* cited by examiner

Primary Examiner—Lana Le

(57) ABSTRACT

Configurable communications modules and methods of making the same are described. In one aspect, a communications module includes a data channel and a termination impedance controller. The data channel is operable to translate data signals in at least one direction between a transmission cable interface and a host device interface. The data channel has a variably configurable termination impedance at a host device node that is connectable to a host device. The termination impedance controller is operable to set the variably configurable termination impedance of the data channel to match the termination impedance to the host system.

25 Claims, 3 Drawing Sheets

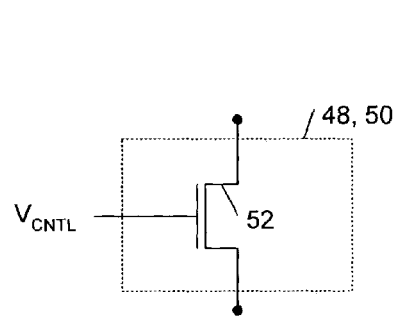
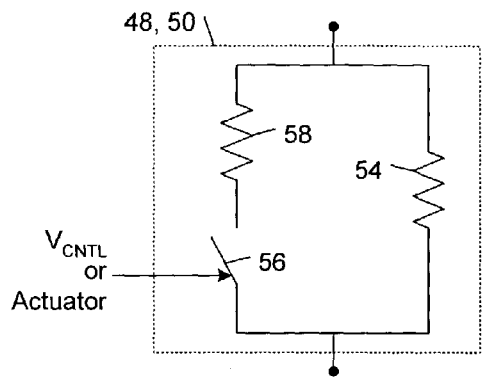
FIG. 3A  FIG. 3B
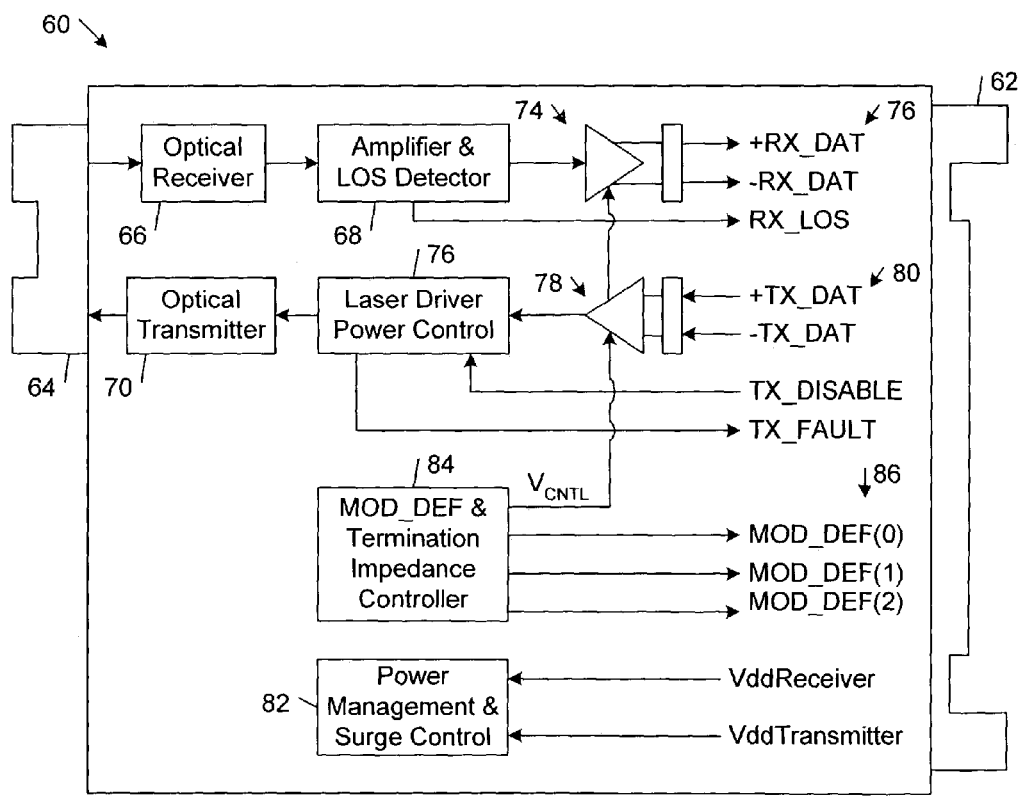
FIG. 4

CONFIGURABLE COMMUNICATIONS MODULES AND METHODS OF MAKING THE SAME

TECHNICAL FIELD

This invention relates to configurable communications modules and methods of making the same.

BACKGROUND

Transmission cables may be used to transmit data between workstations, mainframes and other computers, as well as provide data connections to mass storage devices and other peripheral devices. Data may be transferred using a variety of transmission cable technologies, including multimode optical fiber cables, single mode optical fiber cables, and copper cables (e.g., twinax and coax copper cables). Standard communications modules have been developed to transition between different transfer media and the electronic components inside a computer or peripheral device. Among the common communication modules are transmitter modules, receiver modules, and transceiver modules.

A communications module produces a standardized output to the host system in accordance with prescribed protocols, regardless of the medium (e.g., optical fiber or copper) through which the data is transmitted or received. For example, an optoelectronics transceiver module enables bidirectional data transmission between an electrical interface and an optical data link. A copper transceiver module, on the other hand, enables bidirectional data transmission between two electrical devices.

A communications module typically plugs into a cage that extends out of the rear panel of a host device (e.g., a computer or a peripheral device). The cage connects the transceiver module to a motherboard or circuit card in the computer or peripheral device.

SUMMARY

The invention features configurable communications modules and methods of making the same.

In one aspect of the invention, a communications module includes a data channel and a termination impedance controller. The data channel is operable to translate data signals in at least one direction between a transmission cable interface and a host device interface. The data channel has a variably configurable termination impedance at a host device node that is connectable to a host device. The termination impedance controller is operable to set the variably configurable termination impedance of the data channel.

In one aspect of the invention, a communications module includes a receiver data channel, a transmitter data channel, a termination impedance controller, and a housing. The receiver data channel is operable to translate data signals from a transmission cable interface to a host device interface. The transmitter data channel is operable to translate data signals from the host device interface to the transmission cable interface. Each of the receiver data channel and the transmitter data channel has a respective variably configurable termination impedance at a respective host device node connectable to the host device. The termination impedance controller is operable to set the respective variably configurable termination impedance of each of the receiver data channel and the transmitter data channel. The housing contains the receiver data channel, the transmitter data channel, and the termination impedance controller. The housing has a transmission cable interface end that is connectable to a transmission cable and a host device interface end that is connectable to a host device.

In another aspect, the invention features a method of making a communications module. In accordance with this inventive method, a data channel is obtained. The data channel is operable to translate data signals in at least one direction between a transmission cable interface and a host device interface. The data channel has a variably configurable termination impedance at a host device node that is connectable to a host device. The data channel is mounted in a housing having a first end that is connectable to a transmission cable and a second end that is connectable to a host device. The variably configurable termination impedance of the data channel is set to a termination impedance value substantially matching a target host device termination impedance value.

Other features and advantages of the invention will become apparent from the following description, including the drawings and the claims.

DESCRIPTION OF DRAWINGS

FIG. 3A is a circuit diagram of an implementation of the variable resistance circuit of FIG. 2.

FIG. 3B is a circuit diagram of an implementation of the variable resistance circuit of FIG. 2.

FIG. 4 is a block diagram of an optical transceiver implementation of the communications module of FIG. 1.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
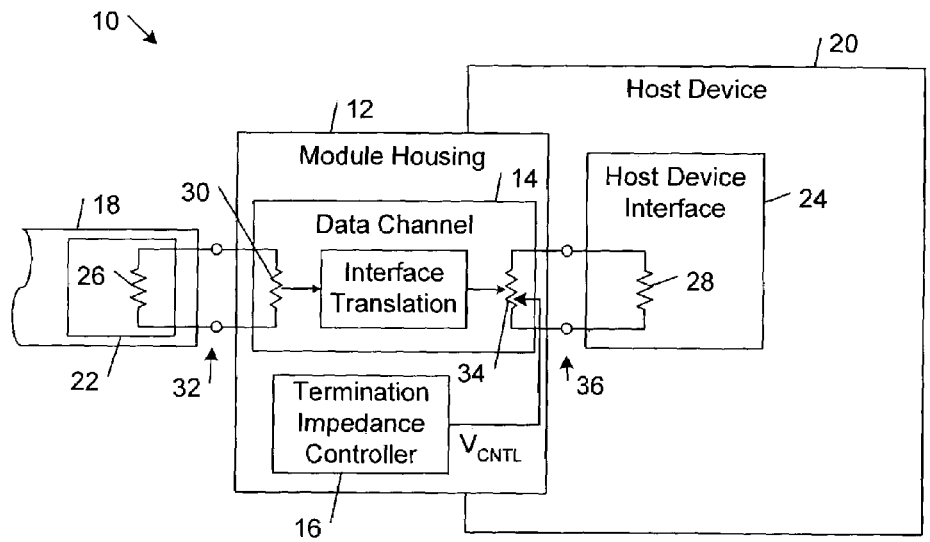
FIG. 1 is a block diagram of an embodiment of a communications module.

FIG. 1 shows an embodiment of a communications module 10 that includes a module housing 12 that contains a data channel 14 and a termination impedance controller 16. In a typical implementation, data channel 14 and termination impedance controller 16 are mounted on a common substrate (e.g., a printed circuit board).

Module housing 12 is configured to connect physically with transmission cable 18 and a host device 20. In general, transmission cable 18 may be any kind of optical or electrical communication cable and host device 20 maybe any kind of device (e.g., a computer or peripheral electronic device). In some implementations, transmission cable 18 includes a connector that is pluggable into a media connector of module housing 12. The media connector of module housing 12 may support any high-performance optical or electrical serial transmission medium technology. In the case of electrical transmission media, the media connector may be, for example, a DB-9 electrical connector, an RJ45 receptacle, or a HSSDC electrical connector. In the case of optical transmission media, the media connector may be, for example, a single connector (SC) duplex media connector, and LC connector, or an MTP/MPO connector. In some embodiments, module housing 12 is pluggable into a mating receptacle of host device 20. The module housing in these embodiments may be implemented in accordance with any pluggable communications module standard, including the Giga-Bit Interface Converter (GBIC) standard, the small form pluggable (SFP) standard, and the small form factor (SFF) standard.

Data channel 14 translates data signals in at least one direction between an interface 22 of a transmission cable 18 and an interface 24 of a host device 20. In general, data channel 14 is configured to connect and/or translate (or convert) data signals from a first serial transmission medium to a second serial transmission medium. In FIG. 1 data channel 14 is shown as having only a single (receiver) interface translation channel. Depending on the particular implementation, however, data channel 14 may provide bidirectional or unidirectional, single channel or multi-channel transmission of data between the first and second transmission media. For example, in a bidirectional optical transceiver implementation, data channel 14 provides bidirectional data transmission between an electrical interface in host device 20 and an optical data link in transmission cable 18. The interface translation channel may be a differential data translation channel, as shown in FIG. 1, or a single-ended data translation channel.

Transmission cable interface 22 is characterized by a characteristic impedance 26 and host device interface 24 is characterized by a characteristic impedance 28. Similarly, data channel 14 has a termination impedance 30 at a cable node 32 and a termination impedance 34 and a host device node 36. For high-speed data transmission applications, the cable and data channel termination impedances 26, 30 at node 32 preferably are matched to reduce reflections and other losses. Similarly, the host device and data channel termination impedances 28, 34 at node 36 preferably are matched to reduce reflections and other losses. In FIG. 1, each of the termination impedances 26, 28, 30, 34 is represented by a single resistive element. In general, each of the data channel 14, transmission cable interface 22, and host device interface 24 may include one or more elements having an equivalent impedance value corresponding to the values of termination impedances 26, 28, 30, 34.

In order to accommodate host devices that have host device interfaces 24 with different respective termination impedances 28, termination impedance 34 of data channel 14 is variably configurable. For example, a legacy GBIC host interface has a 75 ohm (150 ohm differential) termination impedance, whereas a small form pluggable host interface has a 50 ohm (100 ohm differential) termination impedance. As explained in detail below, termination impedance controller 16 is operable to set the variably configurable termination impedance 34 of data channel 14 to an impedance value substantially matching a target termination impedance value of a target host device interface.

Figure 2:
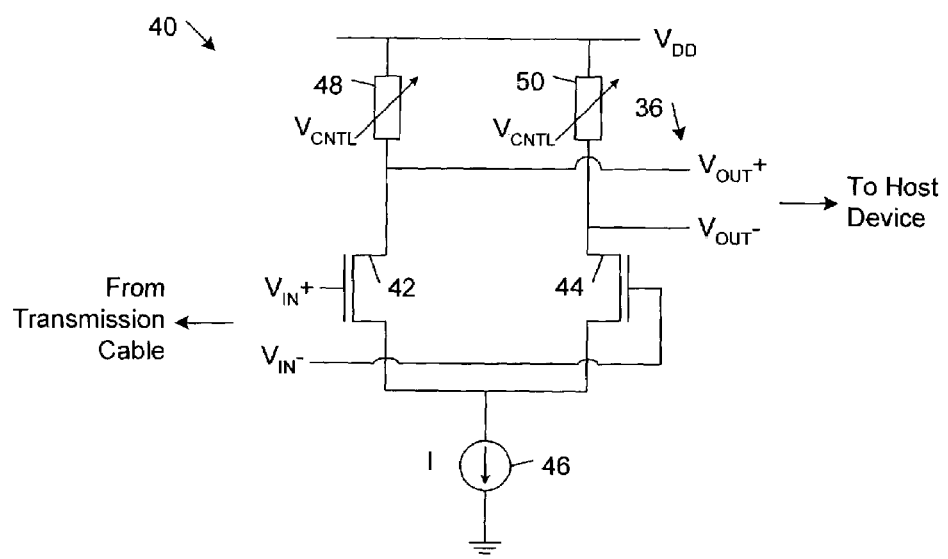
FIG. 2 is a circuit diagram of an embodiment of an output stage of the data channel in the communications module embodiment of FIG. 1 that includes a variable resistance circuit.

Referring to FIG. 2, in some embodiments, data channel 14 includes a differential amplifier 40 connected to host device node 36. Differential amplifier 40 includes a pair of input transistors 42, 44 with gates connected respectively to $V_{IN}+$ and $V_{IN}-$ signals and sources connected to a common biasing current source 46. The drains of transistors 42, 44 are connected to a drain voltage rail $V_{DD}$ through respective variable resistance circuits 48, 50. The differential output signals $V_{OUT}+$ and $V_{OUT}-$ produced at the drains of transistors 42, 44 are delivered to the host device node 36. The impedance values of resistance circuits 48, 50 determine the termination impedance of data channel 14 at node 36. These impedances are set by termination impedance controller 16. In most applications, the impedance values of resistance circuits 48, 50 are set to be substantially equal. In some applications, however, resistance circuits 48, 50 may be set to have different impedance values.

Referring to FIGS. 3A and 3B, in general, resistance circuits 48, 50 may be implemented by one or more circuit elements that cooperatively provide a variably configurable termination impedance that may be set to any one of multiple different target impedance values by termination impedance controller 16. FIG. 3A shows an embodiment in which each of the resistance circuits 48, 50 is implemented by a field effect transistor 52, which has a voltage-controlled resistance value. For small drain-source voltages of either polarity, the resistance value of transistor 52 decreases with increasing applied gate-source bias ($V_{CNTL}$). FIG. 3A shows an embodiment in which each of the resistance circuits 48, 50 is implemented by a resistor 54 that is connected in parallel with a switch 56 and a resistor 58, which are connected in series. In some embodiments, switch 56 is implemented by a transistor, in which case termination impedance controller 16 opens and closes the switch with the electrical control signal $V_{CNTL}$. In other embodiments, switch 56 is implemented by a mechanical switch, in which case the termination impedance controller 16 includes an actuatable element that enables manual control of the mechanical switch. When switch 56 is open, the effective resistance of each resistance circuit 48, 50 corresponds to the resistance of resistor 54. When switch 56 is closed, the effective resistance of each resistance circuit 48, 50 corresponds to the effective resistance of resistor 54 in parallel with the combined resistance of transistor 56 and resistor 58. In other embodiments, resistance circuits 48, 50 may be implemented in different ways.

FIG. 4 shows an exemplary embodiment of communications module 10 that is implemented in the form of a GBIC optical transceiver module 60. Transceiver module 60 includes an electrical connector 62 for connecting the module 60 to host device interface 24 and an optical connector 64 for connecting the module 60 to transmission cable interface 22. An optical receiver 66 is coupled to an amplifier and loss-of-signal (LOS) detector circuit 68. An optical transmitter 70 is coupled to a laser driver and power control circuit 72. A receiver termination circuit 74 converts the signals output from the amplifier and LOS detector circuit 68 into receive data and receive LOS signals 76 and a drive circuit 78 transmits transmit data and other signals to the laser driver and power control circuit 72. A power management and surge control circuit 82 provides power to the circuits of transceiver module 60 and protects against power surges. A module definition (MOD_DEF) and termination impedance controller 84 generates a set of standard module definition signals 86 and generates control signals ($V_{CNTL}$) for setting the variably configurable termination impedances of the transmitter and receiver data channels.

In general, the module definition and termination impedance controller 84 is not limited to any particular hardware or software configuration, but rather may be implemented in any computing or processing environment, including in digital electronic circuitry or in computer hardware, firmware, or software. In one exemplary implementation, the module definition and termination impedance controller 84 is implemented in firmware by a programmable EEPROM controller module.

Figure 5:
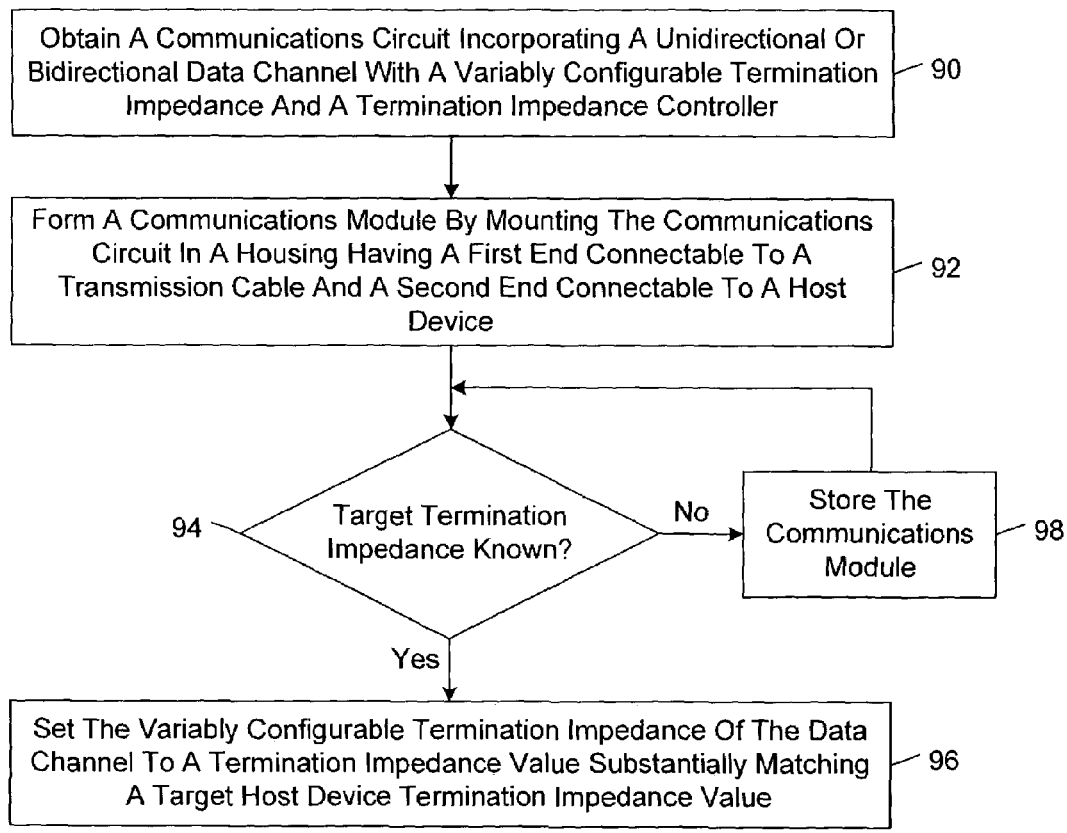
FIG. 5 is a flow diagram of an embodiment of a method of making a communications module.

Referring to FIG. 5, in some embodiments, communications module 10 may be manufactured as follows. A communications circuit is obtained (step 90). The communications circuit incorporates a unidirectional or bidirectional data channel that includes a variably configurable termination impedance. The communications circuit also incorporates a termination impedance controller. In some implementations, the data channel and the termination impedance controller are mounted on a common printed circuit board substrate. A communications module is formed by mounting the communications circuit in a housing having a first end connectable to a transmission cable and a second end connectable to a host device (step 92). If a target termination impedance value corresponding to a target host device is known (step 94), the variably configurable termination impedance value of the data channel is set to a termination impedance value substantially matching the target host device termination impedance value (step 96).

The variably configurable termination impedance value is set by appropriate configuration of the termination impedance controller. For example, in some implementations, the termination impedance controller may be programmed to generate control signals $V_{CNTL}$ that produce the target termination impedance at the host device node 36. In other implementations, termination impedance controller may be configured manually to open or close a mechanical switch that produces the target termination impedance at the host device node 36.

If the target termination impedance is not known (step 94), the communications module is stored (step 98). After the target termination impedance value has been determined (step 94), the variably configurable termination impedance value of the data channel is set to a termination impedance value substantially matching the target host device termination impedance value (step 96).

Other embodiments are within the scope of the claims.

For example, in some embodiments, termination impedance 30 of data channel 14 is variably configurable to accommodate transmission cables 18 having interfaces 22 with different respective termination impedances. In these implementations, termination impedance controller is configured to set the termination impedance 30 to a target impedance value substantially matching the characteristic impedance 26 of transmission cable interface 22.

What is claimed is:

1. A communications module, comprising:
   a data channel operable to translate data signals in at least one direction between a transmission cable interface and a host device interface and having a variably configurable termination impedance at a host device node connectable to a host device; and
   a termination impedance controller operable to set the variably configurable termination impedance of the data channel, wherein the communications module is stored before the variably configurable termination impedance of the data channel is set.

2. The communications module of claim 1, wherein the data channel comprises a variable resistance circuit at the host device node.

3. The communications module of claim 2, wherein the variable resistance circuit comprises a transistor with a voltage-controlled resistance value.

4. The communications module of claim 2, wherein the variable resistance circuit comprises a resistor connected in series with a switch.

5. The communications module of claim 2, wherein the variable resistance circuit presents different termination impedances at the host device node in response to receipt of different respective electrical control signals from the termination impedance controller.

6. The communications module of claim 2, wherein the variable resistance circuit comprises a mechanical switch for selectively connecting the host device node to different termination impedances, and the termination impedance controller enables manual control of the mechanical switch.

7. The communications module of claim 1, wherein the termination impedance controller is operable to selectively set the variably configurable termination impedance of the data channel to a differential resistance of 150 Ohms in a first configuration mode and set the variably configurable termination impedance of the data channel to a differential resistance of 100 Ohms in a second configuration mode.

8. The communications module of claim 1, further comprising a housing containing the data channel.

9. The communications module of claim 8, wherein the housing has a transmission cable interface end and a host device interface end.

10. The communications module of claim 9, wherein the host device interface end of the housing is pluggable into a receptacle of a host device.

11. The communications module of claim 10, wherein the housing is implemented in accordance with a pluggable communication module standard selected from a Giga-Bit Interface Converter (GBIC) standard, a small form physical (SFP) standard, and a small form factor (SFF) standard.

12. The communications module of claim 1 implemented in accordance with a small form pluggable (SFP) configuration or a small form factor (SFF) configuration.

13. The communications module of claim 1 implemented in accordance with a Giga-Bit Interface Converter (GBIC) configuration.

14. The communications module of claim 1, wherein the data channel provides multiple channel transmission of data in at least one direction between the transmission cable interface and the host device interface.

15. The communications module of claim 1, wherein the data channel is operable to translate data signals in both directions between the transmission cable interface and the host device interface.

16. The communications module of claim 1, further comprising a media connector that provides the transmission cable interface and is connectable to a connector of the transmission cable.

17. The communications module of claim 16, wherein the media connector is connectable to a connector of an electrical communication cable.

18. The communications module of claim 17, wherein the media connector is one of a DB-9 electrical connector, an RJ45 receptacle, and a HSSDC electrical connector.

19. The communications module of claim 16, wherein the media connector is connectable to a connector of an optical communication cable.

20. The communications module of claim 19, wherein the media connector is one of a simple connector (SC) duplex media connector, an LC connector, and a MTP/MPO connector.

21. A communications module comprising:
   a receiver data channel operable to translate data signals from a transmission cable interface to a host device interface and a transmitter data channel operable to translate data signals from the host device interface to the transmission cable interface, wherein each of the receiver data channel and the transmitter data channel has a respective variably configurable termination impedance at a respective host device node connectable to the host device;

a termination impedance controller operable to set the respective variably configurable termination impedance of each of the receiver data channel and the transmitter data channel; and a housing containing the receiver data channel, the transmitter data channel, and the termination impedance controller, and having a transmission cable interface end connectable to a transmission cable and a host device interface end connectable to a host device, wherein the communications module is stored before the variably configurable termination impedance of each of the receiver data channel and the transmitter data channel is set.

22. The communications module of claim 21, wherein each of the receiver data channel and the transmitter data channel comprises a respective variable resistance circuit at the respective host device node.

23. The communications module of claim 22, wherein each variable resistance circuit presents different termination impedances at the respective host device node in response to receipt of different respective electrical control signals from the termination impedance controller.

24. A method of making a communications module, comprising:

obtaining a data channel operable to translate data signals in at least one direction between a transmission cable interface and a host device interface and having a variably configurable termination impedance at a host device node connectable to a host device;

mounting the data channel in a housing having a first end connectable to a transmission cable and a second end connectable to a host device;

storing the communications module before the variably configurable termination impedance of the data channel is set; and setting the variably configurable termination impedance of the data channel to a termination impedance value substantially matching a target host device termination impedance value.

25. The method of claim 24, wherein the variably configurable termination impedance of the data channel is set after the data channel is mounted in the housing.

* * * * *